United States Patent [19]

Pham

[11] Patent Number: 5,401,055
[45] Date of Patent: Mar. 28, 1995

[54] SPACE EFFICIENT CENTER TRACKING VEHICLE

[76] Inventor: Roger Pham, Base Hospital Emergency Services Little Rock Air Force Base, Jacksonville, Ark. 72099

[21] Appl. No.: 167,326

[22] Filed: Dec. 14, 1993

Related U.S. Application Data

[63] Continuation of Ser. No. 890,526, May 28, 1992, abandoned.

[51] Int. Cl.⁶ .................. B60R 21/00; B60S 9/00
[52] U.S. Cl. .................. 280/755; 280/764.1; 180/209
[58] Field of Search .......... 280/755, 763.1, 764.1, 280/767; 180/271, 274, 209

[56] References Cited

U.S. PATENT DOCUMENTS

| | | | |
|---|---|---|---|
| 1,546,165 | 7/1925 | Boehm | 180/209 |
| 1,796,339 | 6/1928 | Nicholson | 180/209 |
| 2,293,328 | 8/1942 | Coburn | 280/755 X |
| 2,589,023 | 3/1952 | Pattner | 180/209 X |
| 2,750,204 | 6/1956 | Ohrmann | 280/755 |
| 2,854,084 | 9/1958 | Isaac | 280/755 X |
| 3,236,323 | 2/1966 | Austin | 180/209 |
| 3,306,390 | 2/1967 | Jamme | 180/209 |
| 3,397,898 | 10/1968 | Denney et al. | 280/755 |
| 3,700,059 | 10/1972 | Sutton | 180/209 |
| 3,980,150 | 9/1976 | Gigli | 280/767 X |
| 4,133,402 | 1/1979 | Soo Hoo | 180/209 |
| 5,029,894 | 7/1991 | Willman | 180/209 X |
| 5,048,864 | 9/1991 | Geiger | 280/755 |
| 5,181,740 | 1/1993 | Horn | 280/755 |

FOREIGN PATENT DOCUMENTS

| | | | |
|---|---|---|---|
| 1396383 | 2/1964 | France | 180/209 |
| 2409902 | 7/1979 | France | 280/755 |
| 2830465 | 2/1979 | Germany | 180/209 |

*Primary Examiner*—Brian L. Johnson
*Assistant Examiner*—F. Zeender

[57] ABSTRACT

A center tracking motor vehicle having two wheels arranged in tandem along the longitudinal axis of the vehicle, and which includes a supporting frame and a body completely enclosing the occupants. The vehicle is stabilized at slow speeds by a pair of outrigger struts and retractable wheels mounted on both sides of the vehicle at its mid-length, and they are tucked within the width of the body during normal operation. The outrigger struts may be swung outward to increase the outrigger wheels track width when necessary in adverse weather or road condition, and they are also capable of lifting the vehicle upright should it fall flat on its side.

10 Claims, 6 Drawing Sheets

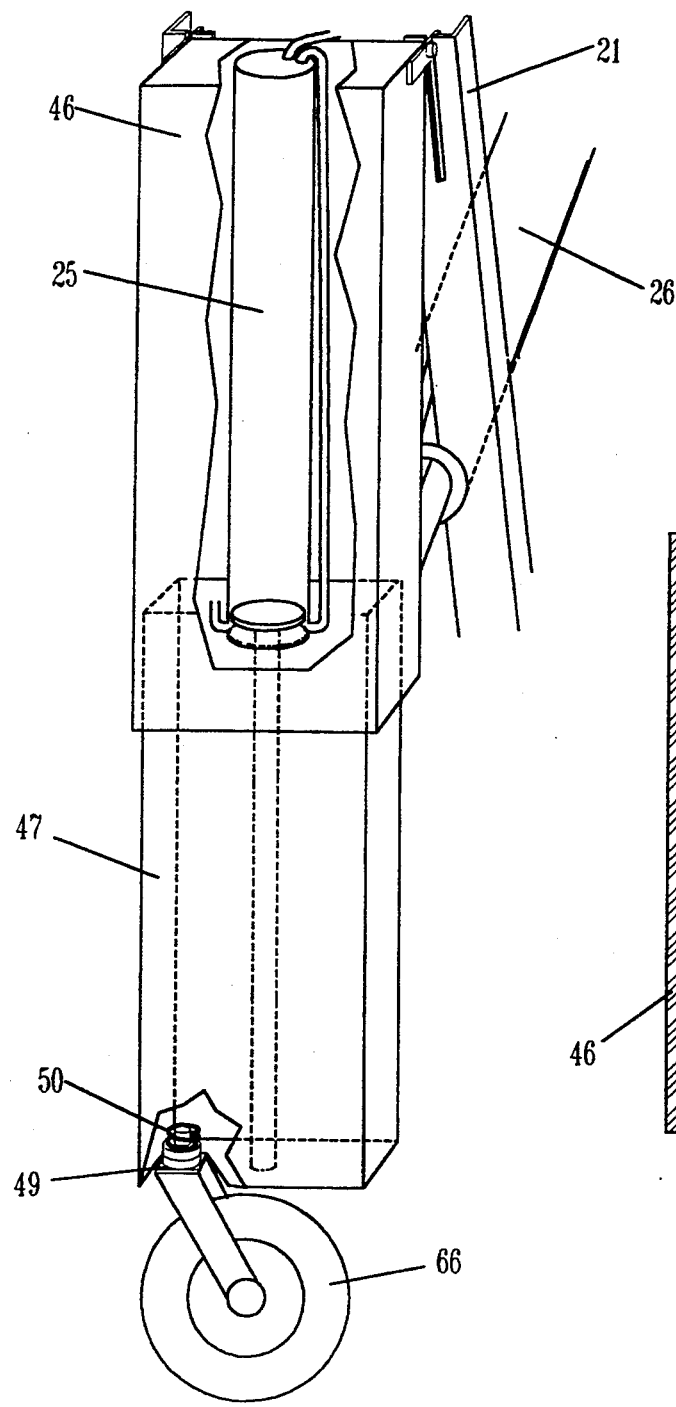
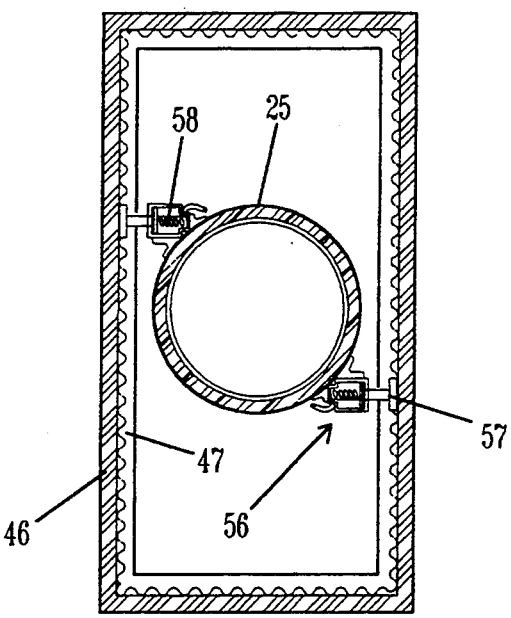
Fig. 4
Fig. 4a

SPACE EFFICIENT CENTER TRACKING VEHICLE

This is a continuation of application Ser. No. 07/890,526, filed May 28, 1992, now abandoned.

BACKGROUND OF THE INVENTION

1. Field of the Invention

This invention relates to efficient, safe and comfortable vehicles for daily personal transportation, and particularly, to a center tracking vehicle with retractable support side wheels to prevent turning over during normal use and during collision.

2. Description of the Prior Art

Two wheeled, or center track, vehicles, such as bicycles and motorcycles have long been commercially used to achieve the above mentioned objectives, however, it is obvious that they do not offer the level of comfort and protection, both from weather and during a collision, acceptable to the general public in developed countries. Furthermore, touring motorcycles do not offer a significant improvement in gas mileage in comparison to economy sized automobiles, because of their lack of aerodynamic efficiency imposed by the fully exposed body of the rider.

Full bodied center tracking vehicles have been described in various patents. These vehicles require means for stabilization against falling over when stopped, moving at low speeds, or when moving on wet or otherwise slippery roadways.

One prior art technique of stabilizing single track vehicles is to use a large passive gyro and utilize its precessional moment to control body roll. In U.S. Pat. No. 3,465,840 to Summers, the vehicle is stabilized against rolling over by a large brute force gyro having a lateral spin axis and a vertical gimbal axis. Roll equilibrium is maintained by application of a vehicle righting gimbal force as a function of gimbal precession rate. While the method disclosed in Summers has met with some success in stabilizing large ships, the weight, expense and complexity of this method have barred two wheeled vehicles from using the method in an economical manner. A second type of stabilizing method which has been described in previous patents uses retractable outrigger wheels of various designs and mechanisms. U.S. Pat. No. 3,700,059 to Sutton discloses a vehicle stabilizing system wherein the outrigger wheels can be steered in the direction of travel, rotated to meet road speed and raised or lowered through an electric mechanized system. Drawbacks to this design involve its great mechanical complexity thus increasing manufacturing cost, its completely exposed outrigger wheel mechanism along both sides of the vehicle, thus taking up almost as much road space as a conventional automobile and offering no advantage in term of space saving ability, and furthermore, the fully exposed outrigger mechanism creates a large amount of wind drag thus offering little advantage in fuel economy over that of an economy car. In U.S. Pat. No. 4,513,837 to Archer, the outrigger device is completely retractable upward in the vehicle's body. However, this upward retractable mechanism can only permit a narrow outrigger support track which makes the vehicle vulnerable to rolling over in slippery road conditions or at a high banking angle. Once the vehicle is rolled over on its side, there is no mechanism built in that can immediately right it, thus creating a very vulnerable situation where it can be run over by other cars. Furthermore, Archer's outrigger mechanism is not placed in the same plane with the center of gravity of the vehicle where it would exert the most effect, but instead is placed behind the center of gravity in line with the rear drive wheel, where it would have decreased stabilizing effect. In U.S. Pat. No. 4,691,798 to Engelbach, the outrigger mechanism is attached to the vehicle frame where it pivots upward when retracted and downward when deployed, and those described actions are coupled to an automatic system controlled by a microprocessor guided by a rate gyro sensor. While no mechanical details regarding the construction of such an outrigger mechanism was described in this patent, it is clear that an outrigger system of sufficient track width for satisfactory stabilization when pivoting up or down on both sides of the vehicle can interfere with traffic on either side of the vehicle, therefore limiting this vehicle's utility. And, like the previously described invention, this design's outrigger system is also placed in line with the rear wheel of the vehicle, thereby limiting its stabilizing ability. In U.S. Pat. No. 4,133,402, a simple and practical outrigger assembly of narrow track base is described attached to the rear wheel of the vehicle, and therefore, as in the two previous patents, its stabilizing ability is limited. In U.S. Pat. No. 5,048,864 to Geiger, a similar outrigger system was described which was very much similar to that of Archer's in that the outrigger system is placed in line with the rear wheel and not near the center of gravity of the vehicle thus significantly limiting its stabilizing ability. Furthermore, this patent requires the width of the vehicle to be nearly as much as that of a sub-compact size car for adequate stability and hence offers little advantage in term of road saving ability.

SUMMARY AND OBJECTIVES OF THE INVENTION

The principal objective of this invention is to produce a personal means of daily transportation sufficiently narrow in width such that two will occupy only a single lane of traffic. In order for this invention to make an impact on solving the current traffic gridlock in most major cities of the world, it must be as safe, as comfortable and as cheap when massed produced as the current automobile.

The present invention lends itself to the lowest aerodynamic drag coefficient and frontal area as well as curb weight using conventional low cost materials in order to produce fuel efficiency two to three times that of modern automobiles with a corresponding reduction in exhaust pollution when using petroleum fuel.

The vehicle's occupant is completely enclosed and protected from the weather and during collision by a strong rigidly framed body with provision for complete air conditioning comfort as well as noise protection.

When stationary or when moving at slow speed, the vehicle is supported in the upright position by a pair of outrigger wheels and struts that are neatly retracted inward into a narrow track only as wide as the vehicle's width in order to save roadway and parking space. This narrow outrigger wheel track can be rapidly widened by the driver when driving over rough, uneven terrain or when encountering slick or icy roads, or in case of high cross wind, in order to improve stability. When the vehicle accidentally falls completely flat on its side, this mechanism can also immediately turn the body upright in order to protect the driver from being run over by other vehicles, or in order for the driver to regain control of the vehicle. During a high speed banking turn, the driver may elect to deploy this mechanism partially in order to prevent excessive banking and hence loss of control. During normal operation, when the vehicle reaches a speed such that the driver can stabilize it solely via the steering mechanism the outrigger wheels will be retracted upward in order to give the driver complete freedom to maneuver.

BRIEF DESCRIPTION OF THE DRAWINGS

FIG. 4 shows details of the outrigger wheel mechanism. FIG. 4a gives fine details of the vertical outrigger struts lock up system, deployed when the vehicle is parked.

DETAILED DESCRIPTION OF THE ESSENTIAL COMPONENTS OF THE PREFERRED EMBODIMENT

Figure 1:
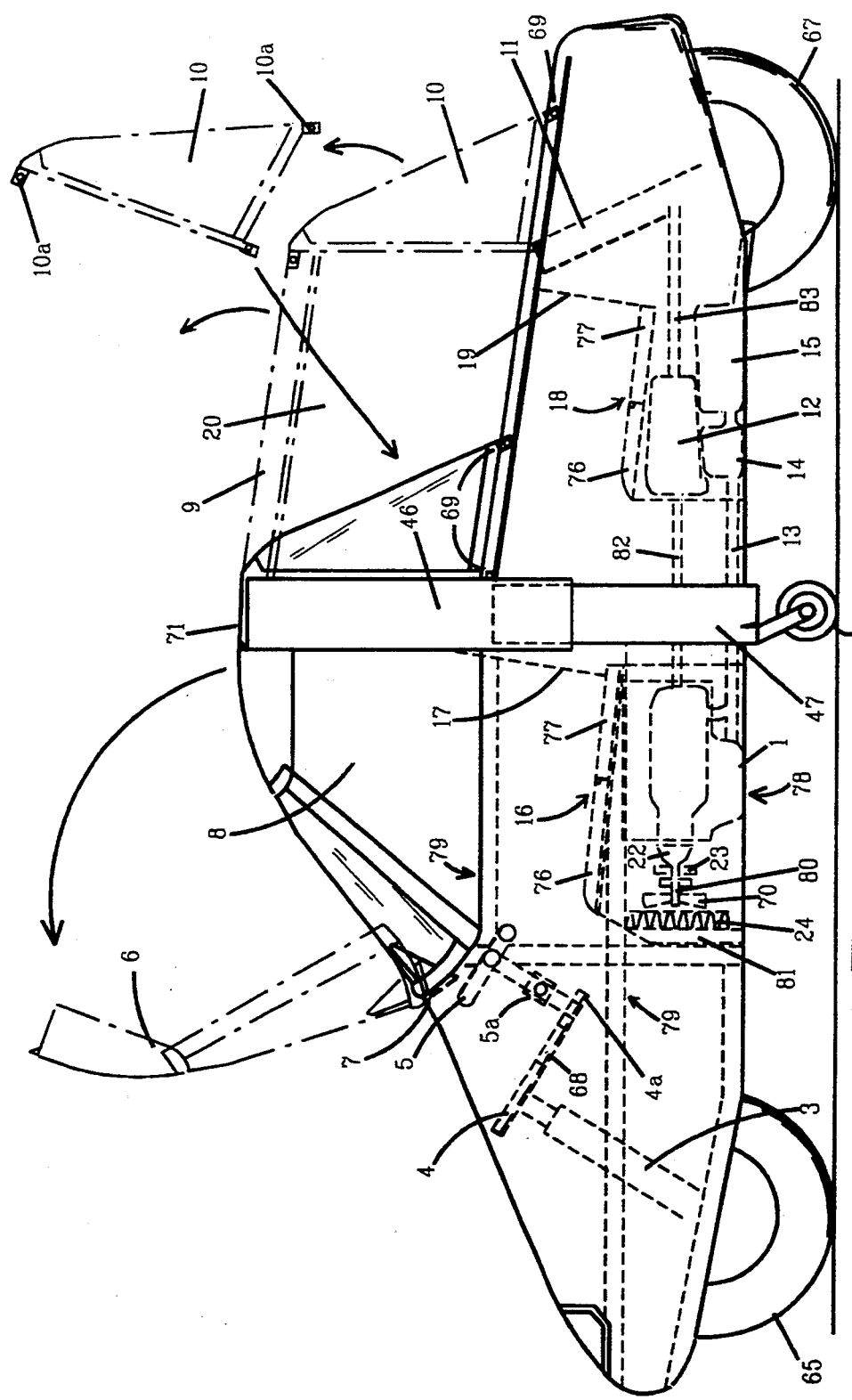
FIG. 1 is a side view of the vehicle showing its salient features and their relative position to each other.

Referring to FIG. 1, a side view of the invention reveals a center tracking vehicle with two main wheels 65, 67 and two outrigger wheels 66 mounted on a strut 47 on each side of the vehicle. The strut housings 46 are supported from the top 71 of the vehicle and attached to two pillars 21 as will be detailed later. The two main wheels 65, 67 are mounted onto suspension mechanisms 3, 11. The suspension mechanisms 3, 11 are of a type well known in the art for supporting the wheels of a conventional motorcycle. However, the steering mechanism differs in that the steering arm 5 is connected to the front main wheel 65 via a pulley 4a which is mounted to the steering arm 5 and connected to another pulley 4 via a toothed belt 68. Pulley 4 is attached to the front wheel suspension mechanism 3. A reduction ratio of two to one is achieved in order to reduce the force required of the driver and to achieve more precise control at high speed. The steering arm 5 is forwardly foldable by means of a pivot mechanism 5a in order to facilitate entry and exit of the vehicle. The driver sits in the front seat 16 and the passenger sits directly behind in tandem fashion. There is ample leg room and head room to fit passengers of all sizes. For a tall driver, the front seat back rest 17 can be moved rearward to improve leg room and vice-versa for a shorter driver. When the rear passenger is not present, the vehicle's profile area can be drastically reduced as follow. First the rear compartment side windows 20 are pulled down, using a sliding mechanism similar to a house sliding window pane. Then, the rear seat back rest 19 can be folded down, and the top hatch 9 will be detached completely and stowed away on top of the folded rear seat back rest 19. Then the rear facing assembly 10 will also be detached and reattached directly behind the driver. The attachment of rear facing assembly 10 is accomplished via protrusions 10a which are inserted into slots 69 in the frame. The exposed top of the rear compartment may be covered by, for example, water-proofed cloth. This major reduction in profile area is very important to the vehicle's stability in a high cross wind. Should it be necessary to carry a rear passenger or an equivalent amount of cargo during a high cross wind, the driver may have to lower the outrigger wheel mechanism and expand its track width to gain stability, and thus take up a whole lane of the road.

Entry and exit from the vehicle will be done via top hatches 6, 9. The front top hatch 6 is fastened in front by a hinge 7. To enter the vehicle the side window 8 is first pulled down. Pulling down the side window 8 allows the opening of the top hatch 6. To protect the surface of the seats 16, 18 from dirt the seats 16, 18 are split in half with a front portion 76 and rear portion 77. The front portion 76 is made to fold upward onto the rear portion 77 so that the passenger steps on the surface underneath it. The vehicle can also be made with conventional side door entry; however, this will to a small extent compromise the strength of the vehicle and the degree of protection during the event of a collision. Furthermore, side doors take up more parking space because they require more space between vehicles when opened. For ease of exiting the vehicle after a collision, doors on both sides must be provided, thus increasing manufacturing cost.

The engine 78 is shock-mounted to the steel beam frame 79. The engine compartment may be insulated to prevent escaped heat. As shown, the engine crankshaft 80 is connected through the water pump housing 22, which should be made sturdy enough in order to support two rows of accessory drive belt pulleys 23. The crankshaft 80 is connected to the radiator fan 70, which is right behind the radiator 24. In front of the radiator 24 is a channel 81 conducting air which will be inducted from both sides of the vehicle to feed into the radiator 24. The rear end of the engine crankshaft 80 is connected to the transmission 12 via a shaft 82. The transmission 12 is situated beneath the passenger seat 18 and is connected to the rear wheel 65 via a drive shaft 83. The exhaust manifolds 13 run low on both sides of the vehicle and are connected to a centrally placed catalytic converter 14 which connects to a muffler 15.

Figure 2:
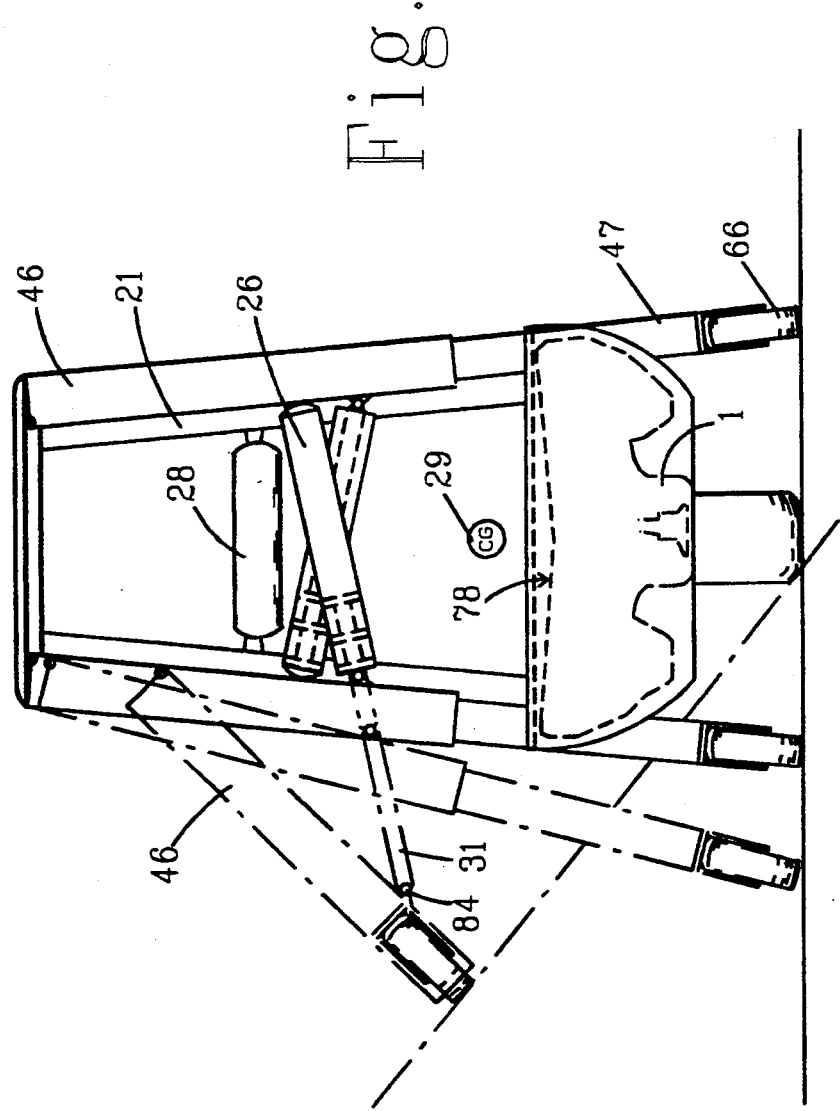
FIG. 2 is a front-view of the vehicle depicting its opposed horizontal engine, oil pan, and different configurations of the retractable outrigger mechanism.

Referring to FIG. 2, a front sectional view of the vehicle shows the arrangement of the retractable outrigger wheel mechanism. It also shows the horizontal opposed engine 78 spanning almost the entire width of the vehicle, with the oil pan 1 occupying the lowest position. This figure illustrates the tight fit of all of the essential components. As shown, the vertical strut housings 46 on both sides are mounted on the pillars 21 in such a way that they are able to slide up and down on the pillars 21 when the horizontal gas cylinders 26 are activated by compressed air. The horizontal gas cylinders 26 are tightly welded on the pillars 21 as parts of the structural components and are unable to move up or down. The piston ends 31 of the horizontal gas cylinders 26 are attached via a hinged mechanism 84 to the vertical strut housing 46. Since the length of the vertical strut housing 46 is constant, it follows that the housing 46 must be able to slide down on the pillars 21 in order for the horizontal gas cylinders' piston ends 31 to move outward, forming a triangle. The outrigger wheels may be cleanly retracted up past the center of gravity 29 of the vehicle as shown on the left side of the drawing, so that even if the vehicle should accidentally fall flat on its side on the ground, it is still able to right itself automatically. This is accomplished as follow: First, the horizontal gas cylinder 26 on the down side will expand due to forces of compressed air stored in container 28 after (and only after) the vertical strut 47 on the same down side is completely retracted upward. This action will cause the vehicle to rise up on its side, up to only about fifty degrees from horizontal when the horizontal gas cylinder 26 is expanded to its full range. At this time the vertical strut 47 on the same side will then expand to further raise the vehicle to about eighty degrees from horizontal, while the horizontal gas cylinder 26 then retracts inward to bring the vehicle to ninety degree or vertical position. In actual use, the driver would be able to quickly deploy the outrigger mechanism in order to "catch" the vehicle before it falls completely on its side, and therefore the previously mentioned scenario rarely ever happens, however, it is very important for the operator to have complete confidence in his vehicle's stability and safety for the complete pleasure of motoring. It should be noted that making the vehicle able to lift itself completely and quickly off the ground is no easy task, due to its gross weight of about 1450 lbs (659 kgs), which means that the horizontal gas cylinder 26 must very quickly and by itself generate forces much in excess of the vehicle's weight, due to its proximity to the vehicle's center of gravity thus giving no mechanical advantage. Therefore, the horizontal gas cylinder 26 must necessarily be rather large in diameter, in this case three inches of inner diameter (7.6 cm) in order to give the piston's surface area of about seven square inches (45.2 cm2). FIG. 2 also shows the various positions that the outrigger wheels can be deployed, and of course, the driver is able to vary the track width in indefinite proportions from the maximum range as shown, in response to the weather or road condition while giving respect to the amount or distance of traffics on either side.

During routine use in adequate road traction and non-stormy weather, the outrigger wheels track width is kept to minimal, by which they are tucked neatly within the width of the vehicle, even during parking or slow vehicle speed. The vertical struts 47 are maximally expanded during parking.

The pressurized air reservoir 28 is shown to emphasize the importance of its location, which should be as close to the struts as possible in order to maximize the speed of expansion of the struts without resorting to unsightly and lengthy large diameter tubing which are prone to damage and leakage.

When the vehicle is parked and the engine turned off, the driver is provided with a manually operated device so that he can lock the outrigger mechanism in precisely the same position, so that in the case there is a slow gas leakage in one of the struts while the vehicle is being parked, the vehicle would still remain upright. Of course, when the engine is turned on, the air compressor will be activated in response to a lower level of air pressure in the reservoir, and the pressurized air reservoir 28 will in turn furnish sufficient air pressure to the gas struts as programmed, prior to the driver's release of the said manual lock.

Should there be a total pressure lost in the pneumatic system due to air compressor failure, the outrigger wheels will hang down due to gravity, but will still passively allow the vehicle to run or to bank into a turn at reasonable speed. The driver will be notified of this by a low pressure warning light or buzzer. Before the vehicle slows down to a speed that the driver cannot balance it by steering wheel action, he will then activate the manual lock effectively locking the outrigger wheels in place before braking into a stop, preventing sideways collapse of the vehicle when it finally stops. When the vehicle is moving again, the driver will maintain the outrigger in the locked position until sufficient speed is attained then manually release the lock. This way, the vehicle can be driven temporarily to a repair shop. This manual locking device is mounted in the cockpit and linked to the outrigger mechanism via a hydraulic system similar to the braking system of the automobile, and any one skilled in the art should be able to adapt it for this purpose.

Figure 3:
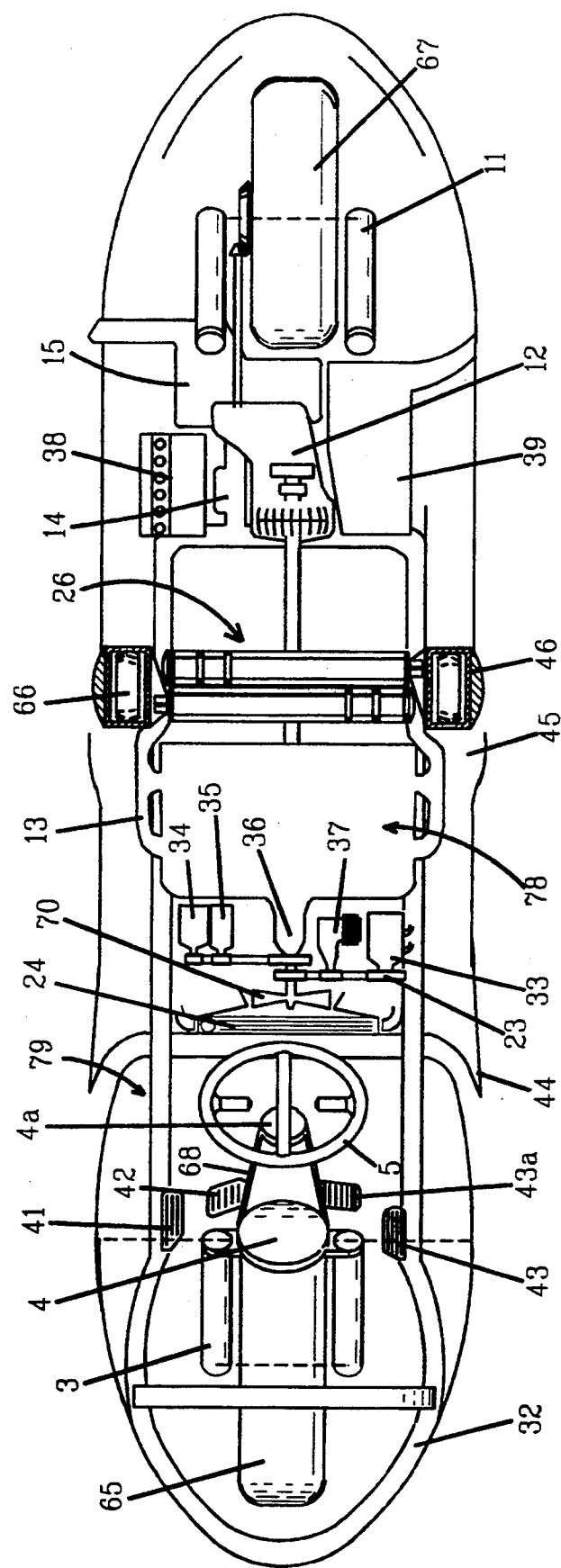
FIG. 3 is a top-view of this vehicle showing relative positions of essential components.

FIG. 3 represents a top sectional view of the vehicle. The steel chassis 32 of the frame 79 is represented, onto which the engine 78, transmission 12, catalytic converter 14, muffler 15, battery 38, and fuel tank 39 are mounted. The relative position of the horizontal gas cylinders 26 and vertical gas strut housings 46 are shown along with the outrigger wheels 66. The steering mechanism is again shown with the toothed drive belt 68 mounted with adjustable tension onto two toothed pulleys 4 and 4a. The gas pedal 41 lies on the right side of the driver, while the brake pedal 42 is more to the left of the gas pedal, and the clutch pedal 43 is on the extreme left, as in the automobile. The outrigger strut lock pedal 43a is on the right of the clutch pedal, and it is hydraulically linked to both vertical outrigger struts (details on FIG. 4a). The transmission 12 is mounted rearward to optimize the vehicle's weight distribution. The air dams 44 on both sides of the vehicle from the seat level down to the bottom of the body serve to induct air into a channel beneath the front seat and just in front of the radiator 24 for the purpose of cooling it. The radiator fan 70 situated right behind the radiator 24 further improves the cooling air flow into the engine compartment.

Immediately behind the radiator fan 70 are the accessory belt drive pulleys 23 which are mounted on the crank shaft 80 as are the fan 70 and the water pump 36. The crankshaft 80 drives through the water pump housing 22 thus using it as the bearing to support the mentioned two pulleys 23. On the left side, the pulleys 23 are connected to the air compressor 37 and the air conditioning system compressor 33. On the right side immediately adjacent lies the alternator 35 and further to the right lies the supercharger 34. Cooling air will flow past the engine and exit through two openings 45 on both sides right behind and below the drivers seat.

FIG. 4 shows details of the outrigger wheel assembly. The vertical gas cylinder 25 is attached to the strut housing 46 for added structural rigidity. The strut 47 is to slide up and down on the strut housing 46.

The strut housing 46 is hinged to the upper portion of the pillar 21. The strut housing 46 is attached to the horizontal gas cylinder 26 on its lower end as shown in order for it to be deployed laterally. The horizontal gas cylinder 26 is firmly attached to the vehicle's pillars 21, serving as a part of the vehicle's structural frame as well.

The outrigger wheel 66 is ball bearing supported and is allowed to swivel on an axis 49 so that it can turn correspondingly when the vehicle turns while the outrigger wheels are on the ground. When the wheel 66 is retracted off the ground, a coiled spring 50 situated on axis 49 should keep the wheel 66 almost parallel to the vehicle's longitudinal axis so it won't get stuck, as when it is allowed to be completely free to swivel on axis 49. The coiled spring 50 should be fairly weak to allow for 180 degrees swiveling of the wheel 66 on axis 49 when the vehicle is put into reverse.

FIG. 4a is a cross sectional view of vertical strut assembly, showing strut 47 inside strut housing 46. The contact surface on strut 47 is interrupted by grooves in order to reduce friction by reducing the contact area, and furthermore, to prevent jamming by dirt or grease. The vertical gas cylinder 25 is attached firmly to the roof of upper housing 46. Attached to the lower portion of the vertical gas cylinder 25 are small hydraulic piston assemblies in order to allow for the locking up of the strut housing 46 on the strut 47 in the fully extended position when the vehicle is parked. As shown, the hydraulic line feeds oil into the cylinder 56, which in turn expands the piston thus driving the rubber lined wedge 57 outward to block upward motion of strut 47. Coiled spring 58 attached to cylinder 56 and piston wedge 57 allow for retraction of the wedge 57 inward when hydraulic oil pressure is reduced, thus permitting the retraction of the strut 47 upward.

Figure 5:
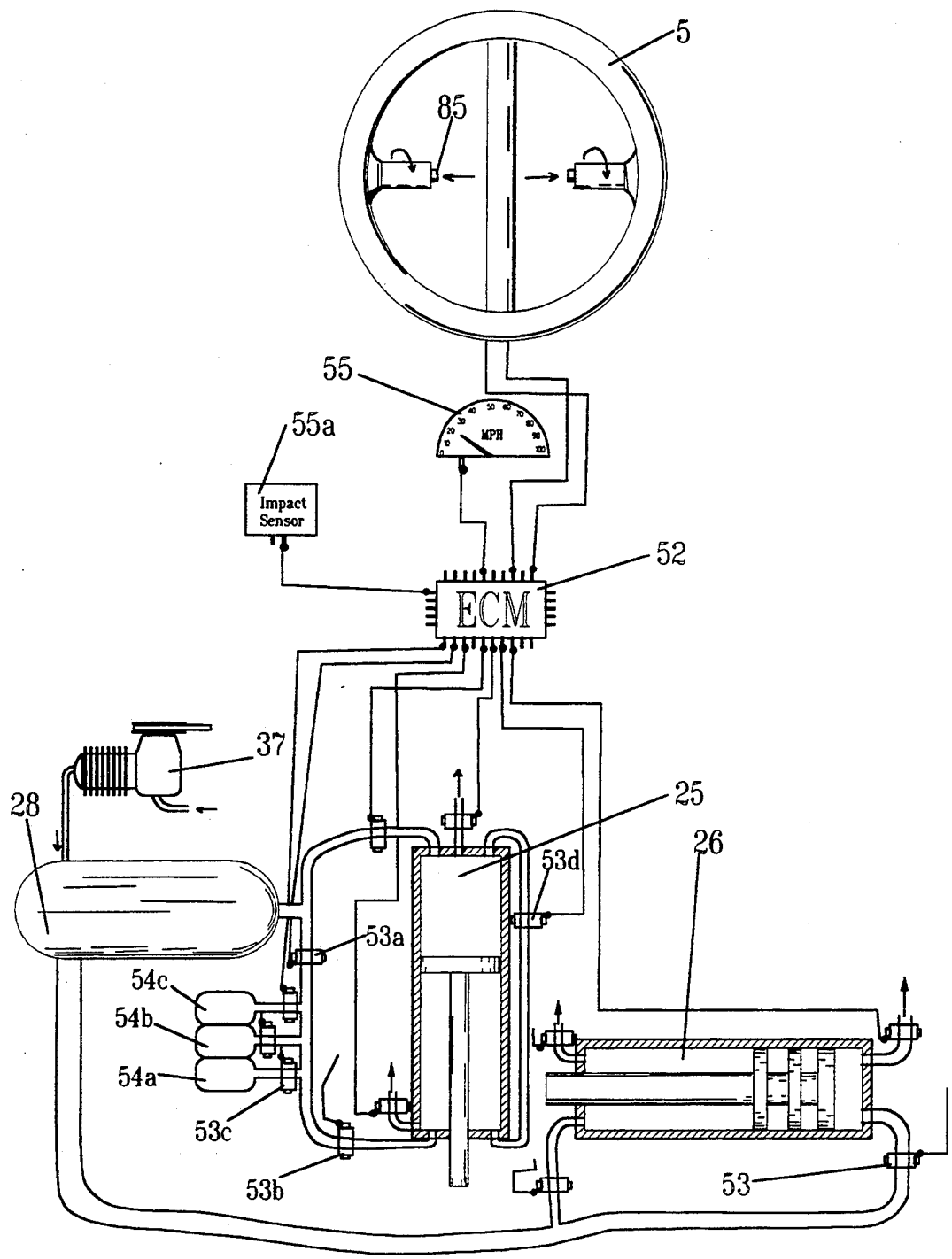
FIG. 5 is the schematic diagram of the activation and control hookup of the outrigger mechanism.

FIG. 5 is a schematic diagram showing the activation and control of the outrigger mechanism. The air compressor 37 which is powered by the engine 78, supplies the air tank 28 with about 300 psi (204 N/cm2) of pressure. The tank is connected to the gas cylinders 25, 26 via hoses, and along the hoses are connected pressure sensors and electromagnetically controlled air valves, of which 53 is an example. As shown, pressure hoses and air venting outlets are mounted on both ends of the gas cylinders 25, 26 in order to effect movement or forces in both directions. The pressure sensors and the air valves are linked to the vehicle's electronic control module (ECM) 52 via electrical wires. The ECM 52 is connected to the speedometer 55. A preprogrammed microcomputer inside ECM 52 is responsible for all the automatic functions as follows:

When the vehicle is parked, the vertical gas cylinders 25 are pressurized with 300 psi (204 N/cm2) of pressure, and this is regulated by the pressure sensors feedback connected to the gas struts 25, and to the ECM 52, which in turn controls the air pressure valves to regulate the air flow from tank 28. Counter pressure of 300 psi (204 N/cm2) (on the bottom surface of the piston) is supplied by a hose connected to the bottom of the vertical cylinder 25, and connected to this hose in parallel fashion are three air chambers 54a, b, c of small volume. The air chambers 54 connection to the hose is interrupted by valves of which 53c is an example, and these valves are closed when the vehicle is not moving. Valve 53a controls air flow from air tank 28 to the counter pressure hose, and valve 53b controls flow from said hose to the bottom of cylinder 25, and they are both closed when the vehicle is not moving. Because valve 53b is closed, there is effectively no counter pressure and gas strut 25 cannot function as a shock absorber, but it will yield completely when the force impinging on the outrigger wheel exceeds 900 pounds (4008N).

When the vehicle starts to roll at slow speed above 2 mph (3.2 km/h), the signal from the speedometer will cause the ECM 52 to open up valve 53b. This action provides the bottom of cylinder 25 with counter pressure of 300 psi from the hose, thus allowing the gas strut 25 to act now as a shock absorber. But because the volume inside this hose is very small, the piston only has to travel a very small distance upward before the counter pressure diminishes significantly, thus requiring progressively more force to move upward, similar to a stiff spring. At slow speed, not much shock absorbing is needed. This limited shock absorbing property can also allow the vehicle to lean slightly in a turn. When vehicle speed exceeds 6 mph (9.6 km/h), air chamber 54a opens up, thus allowing for more counter pressure chamber volume and better shock absorbing property. The trade off is a decrease in stabilizing ability of the outrigger struts. This trade-off is justifiable because with some vehicle speed, the drive now can provide some additional balancing of the vehicle by steering action. Air chamber 54b opens up at vehicle speeds above 10 mph (16 km/h), and at speeds of 15 mph (24 km/h), air chamber 54c opens up as well, thus maximizing shock absorption. The air chambers remain open at higher speeds.

At speeds above 15 mph the outrigger wheels 66 are retracted upward. Depending on the vehicle's speed, the higher the vehicle's speed, the higher the outrigger wheel are retracted, in a step-wise fashion, up until the outrigger wheels 66 pass the bottom floor of the vehicle, to allow for leaning during a turn, and also allow for improved aerodynamic efficiency. This retraction is accomplished by the coordination of the air venting valve on top of the cylinder 25 and valve 53a, while pressures on top and the bottom of the piston is always maintained at 300 psi (204N/cm2).

The driver may alter the shock absorbing property of the gas strut 25 any time, simply by twisting action as shown on the steering handle. For example, when encountering a parking lot speed bump at slow speed, the driver should twist upward on the handle, thus easing the outrigger wheel through the speed bump, and after passing it, return to stiffer shock absorbing mode to gain stability at slow speed. When the outrigger wheel track width is increased, shock absorbing ability should also increase automatically, because the vehicle now has increased stability.

When the vehicle decelerates from cruising speed, valve 53d which connects the volume on top of the piston to the bottom of the piston opens up briefly in step-wise response to the vehicle's decrease in speed, thus allowing the outrigger wheels to gradually lower by force of gravity. This allows for conservation of pressurized air, which requires a lot of energy to produce. Of course, when the driver wants rapid and forceful lowering of the outrigger wheels, he will twist downward on the wrist handle, thus forcing air into the top of the cylinder, while simultaneously, venting air on the bottom of the cylinder. The electromagnetic air pressure valve works the same way as the fuel injector in current automotive use, in which the computer controls the duration of time that the valve remains opened to deliver a precisely controlled amount of air at a given pressure.

The driver can override any of the automatic functions as described without taking his hands off the steering arm 5, as mentioned. The spring loaded push button 85 at the side of the hand grip serves to temporarily deploy the horizontal gas cylinder 26 in order to increase the outrigger wheel track when necessary. The response to the push button is proportional. When the button is released, the outrigger struts will automatically retract back inward. To safeguard against accidental pushing of the button which may cause the outrigger strut to swing out and hit an adjacent vehicle, the driver must push both of them simultaneously, or must twist the hand grip and push the button at the same time in order for it to work. Furthermore, sufficient spring tension must be built in the buttons and hand grips in order to guard against misuse. To deploy the horizontal gas strut for prolonged period of time, a sliding lever mounted on the instrument panel should be use to regulate the desirable outrigger wheel track width.

Impact sensors 55, similar to those used to deploy automobile air bags may be linked to the ECM 52 in order to partially deploy the outrigger struts in event of significant collision or in order to prevent the vehicle from falling on its side after the vehicle leans past a pre-set angle from a horizontal plane. The driver, of course can override this function any time.

Figure 6:
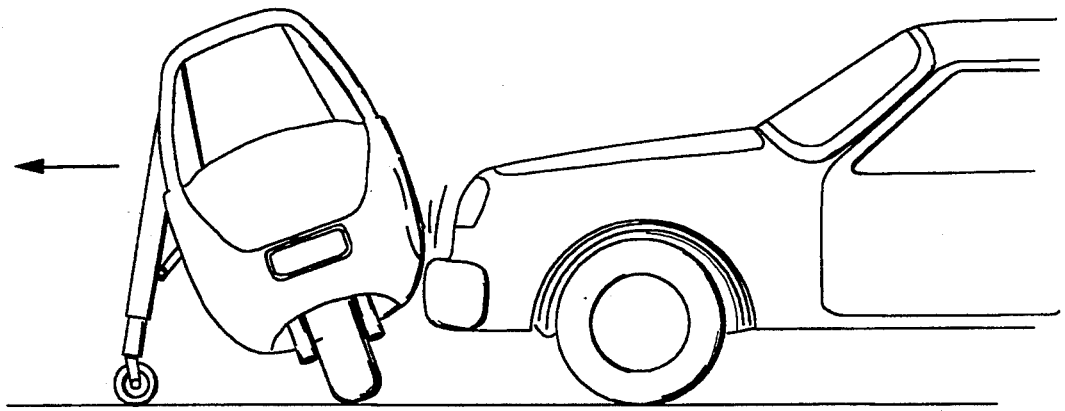
FIG. 6 illustrates this vehicle's being hit on the side by an automobile and how its outrigger wheel mechanism can be deployed to prevent the vehicle from being turned over.

The general public perceives two-wheeled vehicles as being highly vulnerable when being hit from the side. FIG. 6 illustrates that the bumpers on most cars reach below this vehicle's driver's seat, where it is most heavily fortified with steel beams on both sides. Even if this vehicle is pinned against the wall when hit, it is still next to impossible to crush into the driver's seat, because of the presence of the sturdy engine block spanning the width of the drivers seat. An electrically controled fuel shut off valve may be necessary to prevent fuel spillage.

Fractions of a second after impact, the outrigger struts are laterally deployed on the opposite side in order to prevent the vehicle from falling. Because the outrigger wheel is free to swivel and roll, the vehicle will not roll over but will simply slide laterally. The outrigger strut may be deployed only partially in most situation in order to minimize the chance of it being caught on oncoming traffic.

As any one in this field of art can quickly notice, there are many different adaptations to the principle invented here. Therefore, the scope of the invention should be determined by the appended claims and their legal equivalents, rather than by the examples here given.

What is claimed is:

1. In a motor vehicle which has a body defining an operator's compartment flanked by two lateral body sides, a front wheel and a rear wheel arranged in tandem along a longitudinal axis of the vehicle, a center of gravity, and a body width defined as a straight line distance measured transversly between both of said lateral body sides, for at least one human occupant, the combination comprising:

a pair of outrigger wheels rotatably mounted and disposed in bilaterally symmetrical spaced-apart relationship to said longitudinal axis of said vehicle, wherein a straight line distance between said outrigger wheels when they are in full contact with a supporting surface defines a track width of said outrigger wheels, a pair of struts for securing said outrigger wheels to said vehicle, each of said struts is comprised of at least two elongated components slidingly attached to each other so that said struts can be lengthened and shortened in a linear fashion by sliding action of one of said elongated components onto the other, lengthening and shortening means for altering said struts in said linear fashion, mounting means for securing said struts to said vehicle in a manner that allows swinging movements in a plane perpendicular to said longitudinal axis of said vehicle; said mounting means is at such a location in said vehicle that enables said outrigger wheels to be retracted into a resting position immediately adjacent to said vehicle's lateral body sides; said resting position of said outrigger wheels is at such a predetermined vertical distance from said vehicle's center of gravity enabling said outrigger wheels to restore said vehicle back to a generally upright attitude should said vehicle fall laterally, swinging means for swinging said struts in said manner, electromechanical means for coordinating said swinging means and said lengthening and shortening means of said struts in such a way that enables:
  lowering and raising of said outrigger wheels,
  varying of said outrigger wheels' track width when both of said outrigger wheels are in full contact with the supporting surface, from a first position when said outrigger wheels' track width is approximately equal to said vehicle's body width for maximal conservation of roadway and parking space and for use during normal driving conditions, to a second position placing said outrigger wheels at a horizontal distance away from the respective lateral body sides for use when extra stability is required such as on uneven, sloped or slippery surfaces, or during strong cross winds,
  said swinging means capable of lifting said vehicle from a first position wherein said vehicle assumes a predominantly horizontal attitude with respect to the supporting surface to a second position wherein said vehicle is in a generally upright attitude, and suspension and shock absorption means for said outrigger struts in order to protect said struts and said mounting means of said struts from damaging impact due to irregular road surfaces.

2. The combination of claim 1 wherein:

said vehicle further comprises at least two pillars attached to the vehicle's lateral body sides, each of said pillars has an upper end extending upward above said human occupant's head, said pillars are disposed along a transverse axis substantially inbetween said front wheel and said rear wheel of said vehicle, said pillars possess sufficient mechanical strength to protect said human occupant from head injury during an accident, said mounting means for securing said struts are disposed directly adjacent and lateral to the upper end of each of said pillars on respective sides of said vehicle, allowing said struts to hang downward in a predominantly vertical attitude, while capable of swinging movement in a plane perpendicular to said longitudinal axis of the vehicle, said swinging means of said struts are fixedly attached to each of said lateral body sides of said vehicle in order to also serve as part of the vehicle's structural components.

3. The combination of claim 2 wherein:

said lengthening and shortening means of said struts and said suspension and shock absorption means of said struts comprise of vertically oriented pneumatic actuators, said suspension and shock absorption means having a degree of stiffness, said swinging means for said struts comprises horizontally oriented pneumatic actuators hingedly attached to a component of each of said struts, and at least one end of each of said actuators is fixedly attached to said vehicle's respective lateral body side, and, each of said pneumatic actuators is comprised of:

a cylinder, wherewithin a piston is slidingly fitted,
said piston having a top surface and a bottom surface whereupon both of said surfaces encounter significant pressures from pressurized gaseous matter within said cylinder, and,
means for generating differential pressures across said top and bottom surfaces of said piston in order to provide for movement and a resistive force of said piston.

4. The combination of claim 3 further comprising:
attaching means to fixedly attach to said vehicle's respective lateral body sides transversely across as structural members said horizontally oriented pneumatic actuators, at a predetermined downward angle in order to allow said outrigger wheels to remain in contact with the supporting surface even when said outrigger wheels are swung laterally, and
sliding means within which said mounting means for said struts are placed to allow said struts freedom of linear vertical movement with respect to said vehicle's lateral body sides.

5. The combination of claim 3 further comprising electro-mechanical gas-flow-controlling valves connected to said pneumatic actuators, said valves are electronically linked into an electronic control module in order to selectively control, automatically and with manual override, said outrigger wheel track width, and to raise, retract at any selected position, lower to any selected position, add extra down pressure, and to control at any selected vertical speed, said outrigger wheels.

6. The combination of claim 3 further including a means for varying the stiffness of said suspension and shock absorption means comprising: a plurality of chambers arranged in an interruptable hydraulic connection to the bottom surface of said piston,
valve means to provide for said interruptable hydraulic connection, controlling means linked to said valve means to interrupt said hydraulic connection a varying number of said chambers from the bottom surface of said piston, thereby varying the pressures that the top and the bottom surfaces of said piston encounter as said piston traverses within said said cylinder.

7. The combination of claim 5 further comprising impact sensing means to react in event of a collision by sending a signal to said electronic control module so that outward and downward deployment of said outrigger wheels may prevent the vehicle from falling.

8. The combination of claim 5 further including a means for preventing sideway falling of said vehicle when said vehicle leans at an angle with respect to a horizontal plane, comprising:

means for sensing said vehicle's angle with respect to the horizontal plane,
said means for sensing said vehicle's angle is connected to said electronic control module for appropriate outward deployment of said outrigger wheel on the respective body side when the vehicle dangerously leans past a pre-determined angle from said horizontal plane.

9. In a motor vehicle which has a front wheel and a rear wheel arranged in tandem along a longitudinal axis of the vehicle, the combination comprising:
a pair of outrigger wheels rotatably mounted and disposed in bilaterally symmetrical spaced-apart relationship to said longitudinal axis of said vehicle,
means for securing said outrigger wheels to said vehicle,
suspension and shock absorption means to resiliently couple said outrigger wheels to said vehicle, said suspension and shock absorption means having a significant and variable degree of stiffness to provide stability to the vehicle comprising:
a piston slidingly fitted within a cylinder, said piston is characterized by a top surface and a bottom surface, both of said surfaces encounter pressures from gaseous matter within said cylinder that provide resistive forces to movement of said piston within said cylinder, the suspension and shock absorption means having the stiffness characterized by a change in magnitude of said resistive forces as a function of a change in linear displacement of said piston within said cylinder
means for varying the stiffness of said suspension and shock absorption means, comprising:
a plurality of chambers arranged in interruptable hydraulic connection to the bottom surface of said piston,
valve means to provide for said interruptable hydraulic connection,
controlling means linked to said valve means to interrupt said hydraulic connection of a varying number of said chambers from the bottom surface of said piston, thereby varying the pressures that the top and the bottom surface of said piston encounter as said piston traverses within said cylinder.

10. The combination of claim 9 wherein:
said controlling means is linked to a vehicular speed sensor and an electronic control module, said electronic control module is programmed to decrease the stiffness of said outriggers' suspension and shock absorption means in step-wise fashion correspondingly with an increase in vehicular speed up to a predeterminable vehicular speed.

* * * * *